United States Patent [19]
Moore et al.

[11] 3,773,192
[45] Nov. 20, 1973

[54] PARISON OVEN WITH IMPROVED PARISON REMOVAL STRUCTURE

[75] Inventors: Lawrence A. Moore, Rockford, Ill.; Gordon R. Voll, Beloit, Wis.

[73] Assignee: Beloit Corporation, Beloit, Wis.

[22] Filed: Nov. 6, 1972

[21] Appl. No.: 304,057

[52] U.S. Cl. .................... 214/21, 198/28, 198/185
[51] Int. Cl. ............................................. B65g 47/34
[58] Field of Search ............... 214/21; 198/28, 185

[56] References Cited
UNITED STATES PATENTS

| | | | |
|---|---|---|---|
| 296,506 | 4/1884 | Baldwin | 198/28 |
| 2,944,653 | 7/1960 | Hansen | 198/185 X |

*Primary Examiner*—Robert G. Sheridan
*Attorney*—Roberts B. Larson et al.

[57] ABSTRACT

An oven for heating parisons including a carrying structure for supporting the parisons and carrying them along a path through the oven and a removal structure for separating the parisons from the carrying structure for removal from the oven. A lifting structure includes an upwardly inclined sharp edge which one or both sides of the parisons engage under pressure as they move through the removal structure, causing the parisons to ride upwardly onto an upwardly inclined track structure for separation from the carrying structure, which structure continues to move horizontally past the track structure. The sharp edge may be one or more disc blades, preferably toothed, including sharp edges in the form of parallel upwardly inclined sharp ridges.

20 Claims, 7 Drawing Figures

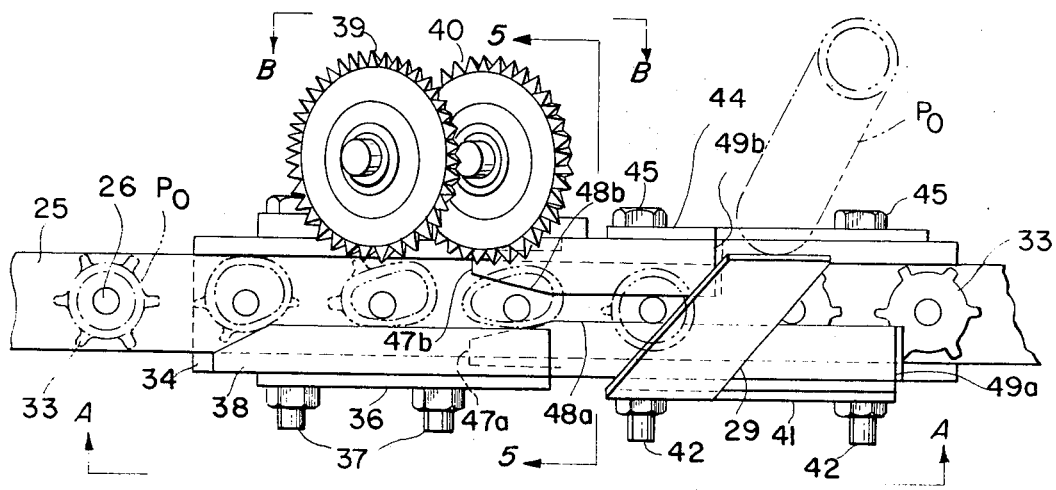
FIG. 2
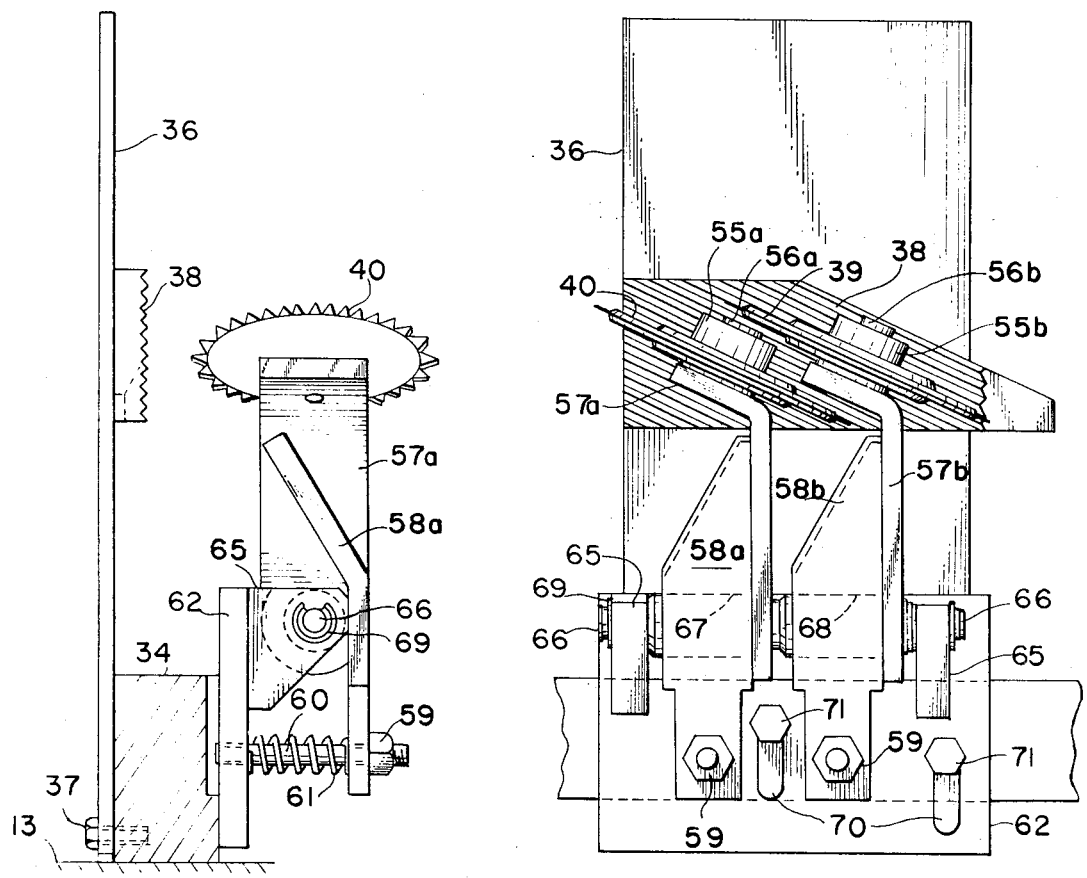
FIG. 5
FIG. 4

PARISON OVEN WITH IMPROVED PARISON REMOVAL STRUCTURE

BACKGROUND OF THE INVENTION

This invention relates to plastic molding, such as blow molding, and in particular it relates to a parison heating oven for use in a molding operation, which oven has an improved arrangement for removing parisons therefrom.

In one type of plastic molding apparatus, cold parisons are heated in an oven structure and then transferred to a blow molding structure where the parisons are formed into a suitable container. Cold parisons, which may be of any suitable shape, are those which have been formed at some time in the past and then cooled down after forming for storage and/or transfer to another location, etc., this being in contradistinction to the well known continuously forming hot parison technique wherein the parisons, still hot from the forming process are delivered directly to the mold. An example of an apparatus for forming containers and the like from cold parisons is described in detail in copending application Ser. No. 276,071, filed July 28, 1972, which is a continuation of application Ser. No. 3,003, by L.A. Moore, filed Jan. 15, 1970.

The parison heating oven used in the said Moore application includes a carrying structure in the form of an endless conveyor which has thereon a plurality of parison holders arranged to hold parisons and carry them along a predetermined path through the oven until the parisons reach a desired temperature, which temperature depends on the particular type of plastic used. The parisons enter the oven at a loading station and are removed at a discharge station. The distance along the predetermined path between the loading station and the discharge station, the speed of movement of the carrying structure and the temperature within the oven are all carefully controlled such that as each parison reaches the discharge station, it has reached this desired temperature, whereby the parisons are removed and carried to the blow mold. If a jam occurs in the apparatus, for example if the blow molding cannot be continued, the parisons will not be removed at the discharge station. However, since this type of oven is a continuously operating one and its economics of operation do not in any way permit the carrying structure to stop until the cause of the jam is removed, these parisons will simply move past the discharge station, as a result of which they will become overheated and hence not useable at this time in the blow mold. These parisons must be removed not only because they are currently incapable of being blow molded (although the parisons may ultimately be recycled) but also they must be removed to clear the parison holders before the latter reach the parison loading station whereat fresh cold parisons will be placed onto the same.

Existing structures used to remove these overheated parisons from the oven include pneumatically operated picker arms under the control of an electrical switch operated in response to a parison moving past the normal discharge station. When actuated, the arms move downwardly into the oven whereat a pair of grasping fingers grasp the overheated parison and move it upwardly out of the oven. The fingers are then opened and the parison released. A spring loaded door closes the oven to block the oven hole during the vertically upward movement to maintain the oven temperature at its critical level. Upon actuation of the switch by the next parison, the door is opened and the arm moved vertically downward into the oven to repeat the parison removal procedure. However, this type of parison removal structure is quite expensive to manufacture, and fairly complicated, has many moving parts and incurs a high risk of failure and is expensive to service.

An improved parison removing structure which is vastly simplified in comparison with the above described arrangement and which hence overcomes may of its disadvantages is disclosed and claimed in commonly owned copending U.S. application Ser. No. 209,201, filed Dec. 17, 1971 by L. L. Mauger.

In the method and apparatus disclosed and claimed in said application Ser. No. 209,201, there is provided at a parison removal station located after the normal discharge station but before the parison feeding station an arrangement including an upwardly inclined track structure comprising a pair of rails, one on each side of the parison carrying structure. The carrying structure itself, and in particular the parison holders thereon are permitted to move completely through the removal station, and in particular through the space between the inclined rails, while the overheated parisons are lifted by these inclined rails up off of their respective parison holders whereat they are deflected away from the carrying structure and out of the oven. This arrangement further requires a means for lifting the parisons just prior to the track structure to assure that the bottoms of the parisons move onto and do not jam against the lower end of the track structure. In the arrangement of application Ser. No. 209,201, this lifting arrangement includes a pair of rigid members secured to a stationary portion of the oven and arranged to engage the upper part of each parison to tilt the same rearwardly so that the front of the lower end of the parison would be raised for movement onto the track structure.

While the overall arrangement of application Ser. No. 209,201 is basically sound and represents a vast improvement over the earlier arrangements for removing overheated parisons, it has been found in practice that the means provided therein for assuring movement of the parisons onto the track structure has not always been effective. Apparently some of the parisons passing this removal station have now become quite soft. Consequently, as the rigid members attempted to tilt the parison rearwardly (to raise the front of the lower end thereof) the top of the parison would simply bend rearwardly leaving the bottom of the parison flat against its holder, as a result of which this bottom would jam against the lower end of the track structure rather than ride up onto the track structure. Thus, a need exists for a new and improved arrangement for assuring that the parisons are lifted for proper movement onto the track structure.

SUMMARY OF THE INVENTION

Thus, it is a purpose of this invention to provide a new and improved apparatus for removing heated parisons from an oven, and in particular, a new and improved arrangement for lifting heated parisons for movement onto a track structure as described in copending application Ser. No. 209,201.

This purpose is achieved in accordance with the present invention by providing a new and improved means for lifting the parisons just upstream from the inclined track structure. According to this arrangement, means are provided for physically engaging the parisons with at least one sharp upwardly inclined edge, the engagement being under at least slight pressure whereby the sharp edge would make at least a slight impression in the parison thus constraining the parison to ride upwardly parallel to the plane of the sharp edge, thereby assuring the necessary upward movement of the parison for proper placement onto the lower end of the track structure.

In a preferred arrangement, at least one disc blade, but preferably two such disc blades are arranged on one side of the path of travel of the parisons, the blades lying in planes which are upwardly inclined in the direction of travel of the parisons. In a preferred arrangement, their angle of inclination will be the same as that of the track structure. Across the path of travel from the disc blades is a backing plate. The distance between the disc blades and the backing plate would be less than the diameter of the parisons passing therebetween, thereby exerting a transverse force on these parisons to create the necessary pressure so that the disc blades will form an impression into the parisons, constraining them to rise upwardly.

The disc blades and the backing plate should preferably be spring biased towards each other so that the space therebetween can open up to at least the diameter of the parisons passing therebetween, which might be required for example if a hard parison is caused to pass between this space, which hard parison would not be susceptible to being distorted. In a preferred arrangement, the backing plate is stationary while the disc blades are resiliently mounted. But of course the opposite arrangement is also possible and is within the scope of the invention.

Operation of this lifting structure is found to be enhanced if the blades are provided with teeth about their circumference. Moreover, either in addition to or in lieu of the sharp edge on the discs, the backing plate can also be provided with upwardly inclined sharp edges in the form of ridges between upwardly inclined grooves.

Thus, it is an object of this invention to provide a new and improved arrangement for removing parisons from an oven.

It is another object of this invention to provide a new and improved arrangement having a minimal number of moving parts for effectively removing overheated parisons from a parison heating oven.

It is another object of this invention to provide, in an oven of the type wherein the parisons are moved along a predetermined path, an arrangement for removing parisons by causing them to ride upwardly along an inclined track, and including a new and improved means for lifting the parisons up onto the track.

It is another object of this invention to provide in an apparatus of the type described, a parison removing arrangement including a lifting structure having upwardly inclined sharp edges applied with at least slight pressure against the parisons passing thereby, constraining the parisons to ride upwardly parallel to the inclination of the sharp edge or edges.

It is another object of this invention to provide a parison removing structure of the type described wherein the parisons are engaged by sharp edges in the form of one or more disc blades lying in upwardly inclined planes and including a backing plate on the opposite side of the parison path from the disc blades, wherein the backing plate may also have upwardly inclined sharp ridges.

Other objects and the advantages of the invention will become apparent from the detailed description to follow, together with the accompanying drawings.

BRIEF DESCRIPTION OF THE DRAWINGS

There follows a detailed description of preferred embodiments of the invention to be read together with the accompanying drawings.

FIG. 2 is a plan view of a parison removal station of the present invention.

FIG. 4 is a partial side elevational view taken in the direction of the arrow B of FIG. 2.

FIG. 5 is a cross-sectional view taken along line 5—5 of FIG. 2.

DETAILED DESCRIPTION OF THE PREFERRED EMBODIMENTS

Figure 1:
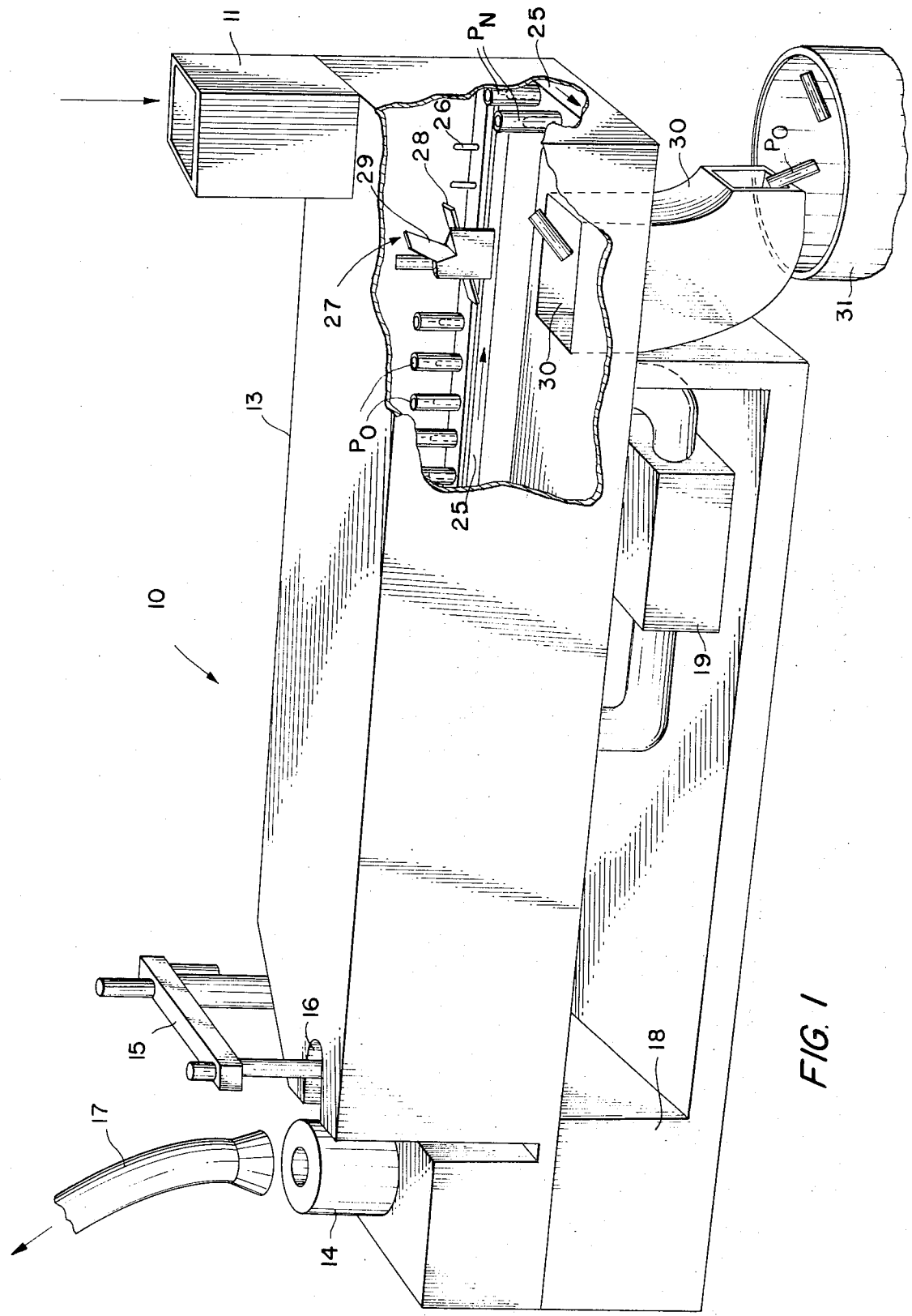
FIG. 1 is a perspective view of a cold parison blow molding apparatus with a portion of the oven broken away to show a parison removal station according to the present invention.

Referring now to the drawings, like elements are represented by like numerals throughout the several views.

Referring to FIG. 1, there is shown a blow molding apparatus 10 in simplified form. The apparatus 10 has a preform feeder 11 and an oven 13 for heating the preform material, the feeder 11 delivering the plastic preform material into the oven 13. A mold structure shown diagramatically at 14 is disposed on the opposite side of the oven 13 from the feeder 11. The plastic preform material within the oven 13 is transferred to the mold 14 by a transfer arm 15 which moves vertically downward into the oven 13 through a discharge opening 16 disposed within the top portion of the oven. Upon grasping a properly heated parison, the transfer arm moves vertically upward, rotates over to the mold 14 and then moves the parison downwardly into the mold 14 where the parison is blown into a suitably shaped container. The arm 15 then swings back to the oven 13 and the finished blown container is ejected through a suitable ejecting means such as ejector conduit 17. The feeder 11, the oven 13, the transfer arm 15 and the mold 14 are supported on a suitable base structure 18. The oven is heated by a suitable heating means 19 which may also be supported on the base 18. A more detailed explanation of the blow molding apparatus 10 can be found in the said Moore application Ser. No. 3,003.

In the preferred embodiment shown in the figures, the plastic material fed into the oven and blow molded is parison shaped, i.e. in the shape of a hollow cylinder. However, other preforms may be fed therein, such as disc-shaped preforms, etc. For the purpose of this application, including the claims, parisons are defined as any suitably shaped plastic preform.

In the cutaway of FIG. 1 there is shown in highly schematic form the overheated parison removal station 27. A parison carrying structure in the form of an endless chain 25 is visible in the cutaway portion before and after passing around a sprocket 24 located in the vicinity of the preform feeder 11. The chain 25 has parison holders in the form of pins 26 fixed thereon and spaced completely along the length of endless chain 25. In FIG. 1, the portion of endless chain 25 downstream from the sprocket 24 is shown with a number of new parisons P$n$ thereon. These new parisons will travel through the oven back and forth as illustrated in application Ser. No. 3,003 until at last they reach the desired temperature at which time they arrive at discharge opening 16 for removal from the oven in the manner described above. However, if for some reason these parisons cannot be removed, for example if a jam-up of some type occurs at the blow mold 14, then these heated parisons will pass by the opening 16. They will then be removed at removal station 27 and the pins 26 will be empty when they again pass beneath the material feed station 11.

At the parison removal station 27, the overheated parisons P$o$ are lifted by means to be described below to ride up a track structure 28 to be separated from their respective pins 26 after which a deflector 29 deflects the removed parisons P$o$ laterally of the endless chain 25 whereupon they fall into a discharge chute 30 and therethrough into a suitable receptacle 31.

The endless chain 25 is shown only schematically in the present application. However, for a more detailed explanation of the chain structure as well as the rotatable star wheels 33 on which each parison holder 26 is mounted, reference is made to the said copending application Ser. No. 209,201, and also to the commonly owned copending application Ser. No. 165,136, filed July 22, 1971 to L. L. Mauger et al.

Figure 7:
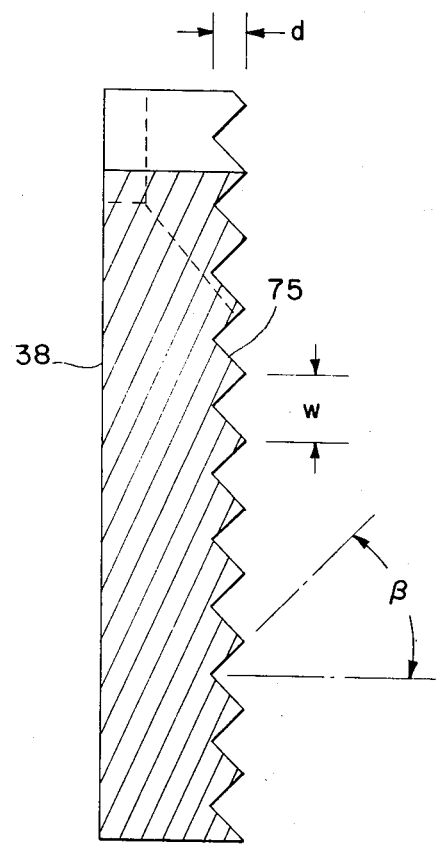
FIG. 7 is a cross-sectional view taken along line 7—7 of FIG. 6.

The removal station 27 will now be described in greater detail with reference to FIGS. 2–7. As has been shown in FIGS. 2, 3, and 5, a rail support and frame piece 34 is rigidly attached to the oven 13 by suitable means such as bolts 35. On one side of this block 34 is attached a first side wall 36 by means of bolts 37. This plate 36 extends upwardly as shown in FIG. 5 and it has attached thereto a backing plate 38. This element 38 is shown in dotted lines in FIG. 3 and it also appears in FIGS. 2, 4, and 5. It is shown in greater detail in FIGS. 6 and 7. As shown in the latter two figures, it has a plurality of grooves 75 inclined upwardly at an angle $\alpha$ which is preferably on the order of 25°. In a preferred embodiment, as shown in FIG. 7, the space between adjacent sharp ridges $w$ is preferably 0.2 inches and the preferred depth of the grooves $d$ would be on the order of 0.1 inches. The angle formed between one sidewall of the grooves and a normal thereto, angle $\beta$ would preferably be on the order of 45°. It will of course be understood, however, that these represent merely a preferred arrangement and that these values may be changed depending on the type of material and the size of the material of the parisons. Preferably the tops of the ridges between grooves 75 will form sharp edges.

The term "sharp edges" as used in the specification and claims does not require a razor sharp edge. Rather, it refers only to an edge which is sufficiently sharp to form at least a slight impression in the relatively soft heated parison when applied against the parison with at least a slight pressure.

Figure 3:
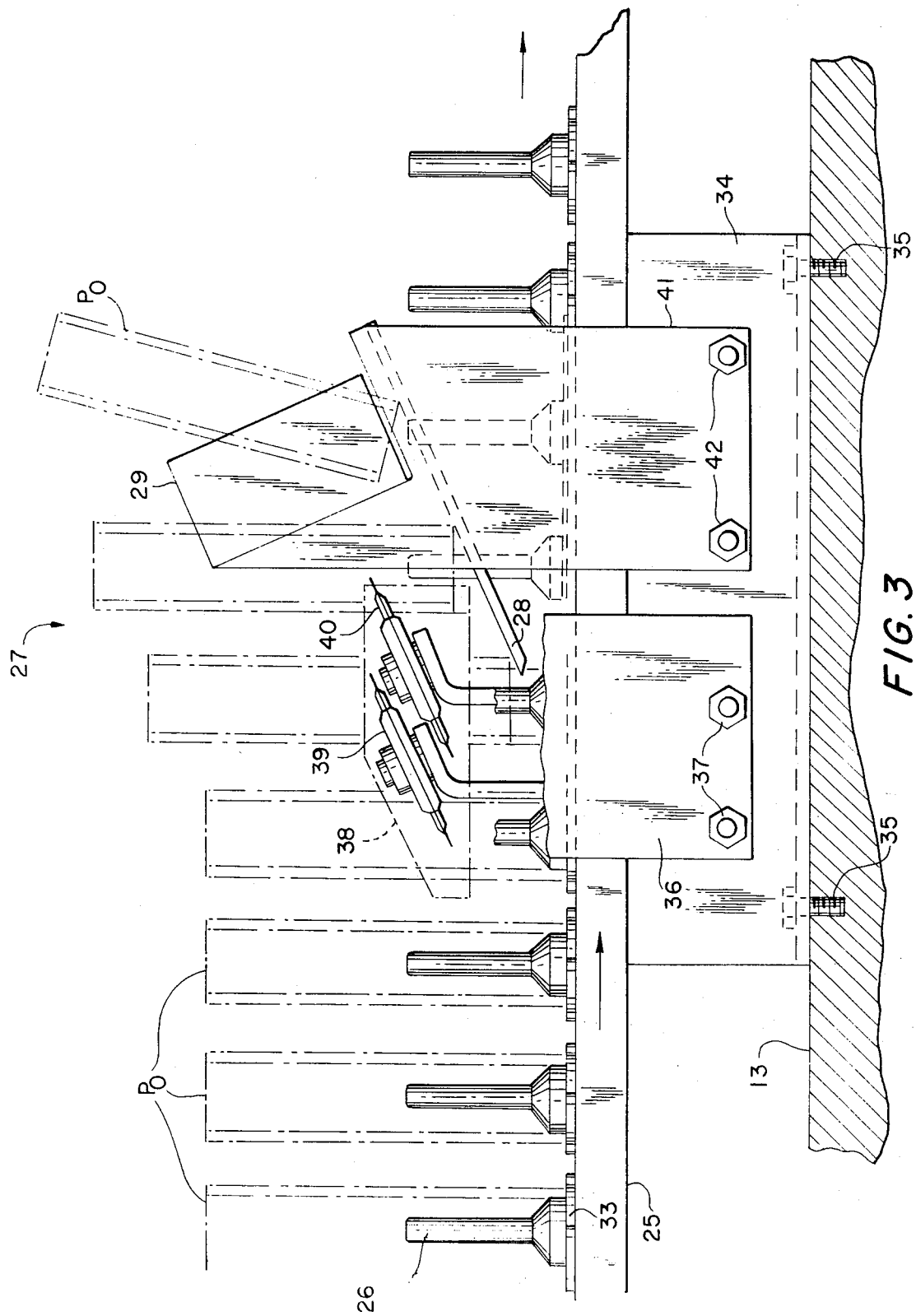
FIG. 3 is a side elevational view taken in the direction of the arrow A in FIG. 2.
Figure 6:
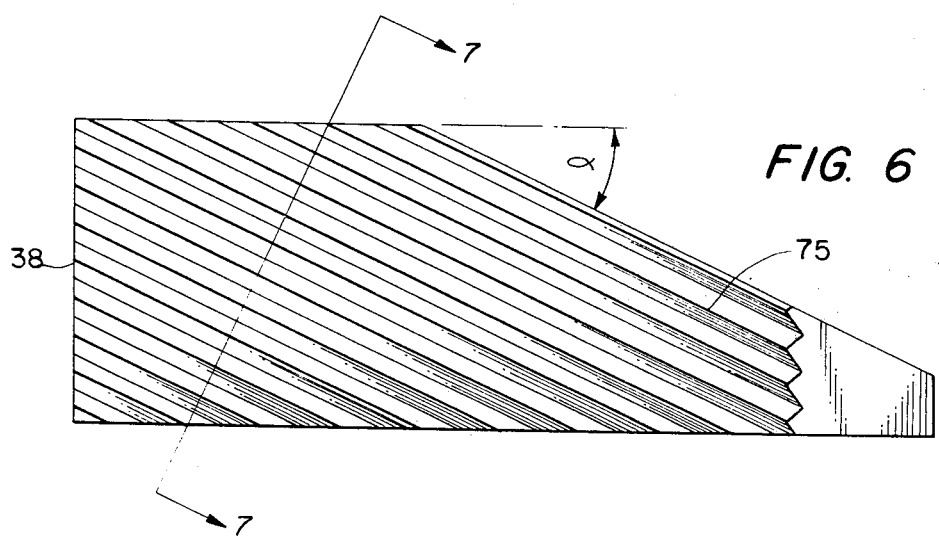
FIG. 6 is an enlarged view of an element of the invention.

On the side of the conveyor opposite from the side wall 36 there is provided a pair of disc blades 39 and 40. As indicated in FIG. 3, these disc blades are rotatably mounted and they lie in upwardly inclined planes. As is illustrated in FIG. 2, these disc blades preferably have teeth formed about their circumference. As illustrated in FIG. 2, the space between the blades 39 and 40 and the backing plate 38 is smaller than the outside diameter of the parisons P$o$. Moreover, as will be explained below, the disc blades 39 and 40 are spring biassed towards the backing plate 38, there being suitable stop means to hold these disc blades in the position shown in FIG. 2. Consequently, as the parisons P$o$ pass in the space between the disc blades and the backing plate 38, the spring loaded disc blades are forced outwardly but they are still forced inwardly by the spring a sufficient amount to distort the parisons and so that the sharp edges of the disc blades 39 and 40 form an impression in the soft parisons.

It will therefore be evident that any parisons passing in this space between the disc blades 39 and 40 and the backing plate 38 will have the upwardly inclined sharp edges of 39, 40 and 38 impressed therein, as a result of which these parisons will follow the path of least resistance which is movement upwardly parallel to the planes of these upwardly inclined sharp edges.

The resilient mounting of the disc blades 39 and 40 will now be explained in greater detail with respect to FIGS. 4 and 5. Referring to these figures, the blades 40 and 39 include, respectively, suitable hubs 55$a$ and 55$b$ mounted for rotation on suitable shafts 56$a$ and 56$b$, each mounted on an upper support arm 57$a$ and 57$b$ which is in turn rigidly connected to a lower support arm 58$a$ and 58$b$. At their lower ends, these arms 58$a$ and 58$b$ are connected by suitable nuts 59 onto bolts 60 which include thereon a spring 61. Firmly attached to the frame piece 34 is a support plate 62. At their inner ends, the bolts 60 are connected to this plate 62. This plate 62 is in turn connected to the frame piece 34 by means of bolts 71 located in elongated slots 70. Because of these elongated slots, the plate 62, and hence the entire structure including disc blades 39 and 40, is adjustable vertically relative to the endless chain. The plate 62 has a pair of arms 65 projecting outwardly therefrom and mounting therein a shaft 66 with suitable circlips at each end. On this shaft 66 there is provided a pair of support rollers 67 and 68 which act as stop means for arms 58$a$ and 58$b$, respectively, under the force of their respective springs 61.

When the parisons have been successfully lifted, their lower ends will pass onto the upwardly inclined track structure 28. See FIGS. 2 and 3. Specifically, this track structure includes a pair of rails 28$a$ and 28$b$ having leading edges 47$a$ and 47$b$, respectively, inside edges 48$a$ and 48$b$, respectively and trailing edges 49$a$ and 49$b$, respectively. The space between edges 48$a$ and 48$b$ is sufficiently wide to permit the pin holders 26 to pass therethrough but of course sufficiently narrow so that the parisons P$o$ cannot pass therethrough but must ride up the rails 28$a$ and 28$b$. The rail 28$a$ is connected to a side wall 41 which is rigidly connected to the frame piece 34 by means of bolts 42. Also connected to this side wall 41 is a deflector plate 29 arranged to deflect the removed overheated parisons laterally so that they can fall to the side of the endless chain 25 and then through the chute 30. Side rail 28$b$ is connected to a suitable side plate 44 which is in turn fixed to the frame piece 34 by suitable bolts 45.

Although the operation of the invention will be apparent from the preceding discussion, for convenience, the operation will be briefly summarized. The parison heating oven 13 is intended to operate continuously, i.e. both the selected temperature within the oven and the selected speed of the conveyor means are maintained throughout a given run. As a result thereof, it is economically unfeasible to stop or slow down the machine even if a jam-up occurs downstream from the parison heating oven, for example at the blow mold 14. Consequently, any parisons which pass the discharge station 16 without being removed are then overheated and hence not currently useable. Rather than slow down the oven in an attempt to save such parisons, it is a practical economic necessity that these overheated parisons be removed from the oven without stopping the continuous operation thereof, and whether or not these parisons can be salvaged, (thermoplastic parisons can be recycled) and such removal must occur before the feeder station 11 at which the parison holding pins 26 will receive new parisons. Thus, as illustrated in the figures, the parison removal station 27 is located downstream from the discharge station, but upstream from the feeder station 11.

At the removal station 27, these overheated parisons Po move in the small but resiliently openable space between the toothed disc blades 39 and 40 on the one hand and the backing plate 38 on the other hand. The sharp edges on 39 and 40 and also the sharp ridges on backing plate 38 are forced against the parisons passing thereby so as to form impressions therein. The parisons then follow the path of least resistance which is upwardly parallel to the angle of inclination of the sharp edges. Thus, a successful lifting of the overheated parisons is achieved, notwithstanding the fact that these parisons may become so soft that they would have simply bent if engaged by the stiff rods in the previous application Ser. No. 209,201. An examination of the motion of the parisons being lifted by these sharp edges reveals that the parisons do not rotate about their axes. This would indicate that the parisons move upwardly with very little undesirable drag. After this lifting motion, the bottom of the parisons Po rise onto the upper surfaces of the track structure rails 28a and 28b whereby the parisons easily continue their upward movement off of their respective pins 26 after which the deflector 29 urges the removed parisons laterally down into the discharge chute 30.

It will be clear that the basic concept of this invention involves engaging the sides of the parisons with sharp edges lying in upwardly inclined planes. In the preferred embodiments, a disc is located on one side, a backing plate on the other side, and one or both of these members has the sharp edges. However, it will be apparent that either the backing plate or the disc member could be used alone, provided some means was provided to insure that the respective member was applied to the parison under pressure, or alternatively, either of these members can be used on both sides of the parison path. For example, on one arrangement rotating discs may be provided on both sides of the path, or in still another arrangement, backing plates could be provided on both sides of the parison path, wherein at least one of these backing plates would include at least one of said sharp edges.

Although the invention has been described in considerable detail with respect to the preferred embodiments, it will be apparent that the invention is capable of numerous modifications and variations apparent to those skilled in the art without departing from the spirit and scope of the invention.

We claim:

1. In an oven for heating parisons including carrying means for carrying parisons along a path through the oven, a means for removing parisons from the oven at a removal station comprising:

a track structure adjacent said path and inclined upwardly relative thereto in the direction of travel of the carrying means, the carrying means being arranged to pass by the track structure as the parisons on the carrying means engage the track and rise up relative to the carrying means to be removed upwardly thereoff of, and lifting means for lifting the parisons just prior to the track structure to facilitate movement of the bottom of the parisons onto the track structure, said lifting means comprising a parison engaging structure including at least one sharp edge located adjacent the carrying means just prior to the track structure and inclined upwardly in the direction of travel of the carrying means, said sharp edge being positioned to engage the side of parisons carried thereby on the carrying means with at least a slight pressure, such that the parisons, while engaged by said sharp edge, ride upwardly generally parallel to the inclination of the sharp edge as the parisons move onto the track structure.

2. The structure of claim 1, wherein said parison engaging structure includes a disc blade lying in a plane inclined upwardly relative to said path, and a backing surface on the side of the path opposite said blade, such that parisons moving by the blade are engaged by both the disc blade and the backing surface which exert said pressure on the parison to assure the said engagement of the blade edge with the parison.

3. The structure of claim 2, said disc blade being mounted for rotation about its axis.

4. The structure of claim 3, the edge of said disc blade having teeth extending around the circumference thereof.

5. The structure of claim 2, said backing surface being a backing plate having grooves formed therein, the ridges between which grooves also form sharp parison engaging edges, said ridges being inclined upwardly parallel to the inclination of the plane of the disc blade.

6. The structure of claim 2, including spring means for resiliently biassing the disc blade toward the backing surface, stop means permitting movement of the disc blade toward the backing surface only up to a rest position which is closer to the backing surface than the diameter of the parisons which pass therebetween, said spring bias thus constituting the said pressure on the parisons which pass thereby.

7. The structure of claim 2, including a pair of said disc blades mounted on the same side of the path and lying in spaced apart parallel planes, both of said disc blades positioned across the path from the said backing surface for engaging the parisons which pass therebetween.

8. The structure of claim 7, said blades being mounted for rotational movement about their axes, and the edges of the discs being formed with teeth extending around their respective circumferences.

9. The structure of claim 8, including spring means for resiliently biassing both of said disc blades toward the backing surface, stop means permitting movement of the disc blades towards the backing surface only up to a rest position closer to the backing surface than the diameter of the parisons which pass therebetween, said spring bias thus constituting the said pressure on the parisons which pass thereby.

10. The structure of claim 1, including a backing plate positioned adjacent said path, said sharp edge comprising at least one sharp upwardly inclined ridge on the backing plate, and means on the opposite side of said path from the backing plate to engage the parisons to cooperate with the backing plate to form the said pressure thereon to assure engagement of the sharp edge with the parison.

11. The structure of claim 10, said means on the opposite side of the path being resiliently biassed toward the backing plate.

12. The structure of claim 11, said means on the opposite side of the path being a disc blade, the edge of which is also a sharp edge engaging the parisons and including a plurality of parallel ridges on the backing plate, whereby said sharp edges and said disc blade cooperate to raise the parisons which pass therebetween.

13. The structure of claim 1, said track structure including a pair of rails inclined upwardly in the direction of travel of the carrying means and located one on each side of said path, and the said carrying means being an endless conveyor having a plurality of upright parison holders mounted thereon, said parison holders being small enough to pass between the rails while any parisons thereon engage and ride up the rails.

14. The structure of claim 13, including a deflector means located adjacent the track structure in the path of the parisons as they ride up the rails, for deflecting the removed parisons off to one side of the endless conveyor.

15. The structure of claim 14, including a chute in the floor of the oven, positioned to receive deflected parisons for removal from the oven.

16. The structure of claim 1, including a backing surface adjacent the said path on one side thereof, and said parison engaging structure comprising at least one toothed disc blade rotatably mounted in a plane inclined upwardly in the direction of travel of the carrying means, the disc blade positioned on the side of the path opposite from the backing surface, said backing surface including a series of grooves and sharp ridges extending parallel to the said disc blade plane, and spring means for resiliently biassing the disc blade toward the backing surface, a stop means for limiting the resilient movement of the disc blade toward the backing surface at a point spaced from the backing surface a distance less than the diameter of the parisons passing therebetween, whereby the resilient force causes the disc blade and the backing surface ridges to engage the parison with said pressure to lift the parison upwardly as the carrying means carries the parisons thereby.

17. The structure of claim 16, including two of said disc blades lying in spaced apart parallel planes, both of said disc blades being positioned across the said path from the backing surface.

18. The structure of claim 16, including means for varying the vertical position of the disc blade relative to the backing surface.

19. An oven for heating parisons including:
a carrying means in the form of an endless conveyor movable along an endless path through the oven and including a plurality of upright parison holders thereon adapted to hold tubular parisons,
a feed station at which tubular parisons are loaded from above onto the parison holders as the carrying means passes the feed station,
a parison discharge station including means for removing properly heated parisons from the carrying means, as the endless conveyor passes thereby, for transferring said parisons to a blow mold,
and an overheated parison removal station located between the discharge station and the feed station for removing from the parison holders any parisons which are not removed at the discharge station, and a removal means at said removal station for removing said overheated parisons,
said removal means comprising:
a track structure adjacent said path and inclined upwardly relative thereto in the direction of travel of the carrying means, the carrying means being arranged to pass by the track structure as the parisons on the carrying means engage the track and rise up relative to the carrying means to be removed upwardly thereoff of,
and lifting means for lifting the parisons just prior to the track structure to facilitate movement of the bottom of the parisons onto the track structure,
said lifting means comprising a parison engaging structure including at least one sharp edge located adjacent the carrying means just prior to the track structure and inclined upwardly in the direction of travel of the carrying means, said sharp edge being positioned to engage the side of parisons carried thereby on the carrying means with at least a slight pressure, such that the parisons, while engaged by said sharp edge, ride upwardly generally parallel to the inclination of the sharp edge as the parisons move onto the track structure.

20. The structure of claim 19, including a chute in the floor of the oven for receiving the removed parisons for delivery out of the oven.

* * * * *